United States Patent
McEwan et al.

(10) Patent No.: US 9,103,274 B2
(45) Date of Patent: Aug. 11, 2015

(54) MULTI-STAGE TURBOCHARGER SYSTEM

(71) Applicant: Cummins Turbo Technologies Limited, Huddersfield (GB)

(72) Inventors: James A. McEwan, Huddersfield (GB); Lee J. Robinson, Huddersfield (GB)

(73) Assignee: Cummins Emission Solution Inc., Columbus, IN (US)

( * ) Notice: Subject to any disclaimer, the term of this patent is extended or adjusted under 35 U.S.C. 154(b) by 0 days.

(21) Appl. No.: 13/686,744

(22) Filed: Nov. 27, 2012

(65) Prior Publication Data

US 2014/0144134 A1    May 29, 2014

Related U.S. Application Data

(63) Continuation of application No. 12/322,342, filed on Jan. 29, 2009, now Pat. No. 8,316,642, which is a continuation of application No. PCT/GB2007/002872, filed on Jul. 27, 2007.

(30) Foreign Application Priority Data

Jul. 29, 2006    (GB) .................................. 0615143.5

(51) Int. Cl.
*F02D 23/00*    (2006.01)
*F02B 33/44*    (2006.01)
(Continued)

(52) U.S. Cl.
CPC .............. *F02B 37/22* (2013.01); *F02B 37/183* (2013.01); *F02D 9/06* (2013.01); *F02M 25/0711* (2013.01); *F02M 25/0713* (2013.01); *F02M 25/0727* (2013.01); *Y02T 10/144* (2013.01)

(58) Field of Classification Search
CPC ...... F02B 37/183; F02B 37/013; F02B 37/18; F02B 37/004; Y02T 10/144
USPC ................ 60/612, 602; 123/562; 137/625.46, 137/625.47, 625.11
See application file for complete search history.

(56) References Cited

U.S. PATENT DOCUMENTS

| 3,370,612 A | 2/1968 | Holl |
| 4,930,315 A | 6/1990 | Kanesaka |

(Continued)

FOREIGN PATENT DOCUMENTS

| DE | 3735736 A1 | 5/1989 |
| DE | 19514572 A1 | 10/1996 |

(Continued)

OTHER PUBLICATIONS

International Search Report, PCT/GB2007/002871, Nov. 27, 2007, Cummins Turbo Technologies Limited.

(Continued)

*Primary Examiner* — Thai Ba Trieu
*Assistant Examiner* — Ngoc T Nguyen
(74) *Attorney, Agent, or Firm* — Taft Stettinius & Hollister LLP

(57) ABSTRACT

A turbocharger system comprises a first relatively small high-pressure (HP) turbocharger and a second relatively large low pressure (LP) turbocharger. The turbine of the LP turbocharger is connected in series downstream of the turbine of the HP turbocharger in a first exhaust gas passage. An exhaust bypass flow passage provides a bypass flow path around the HP turbine. A rotary valve is located at a junction of the bypass flow passage and a first exhaust gas flow passage. The rotary valve comprises a valve rotor which is rotatable to selectively permit or block flow to the LP turbine from either the first exhaust gas passage or the bypass gas passage.

20 Claims, 11 Drawing Sheets

(51) Int. Cl.
  *F02B 37/22* (2006.01)
  *F02B 37/18* (2006.01)
  *F02D 9/06* (2006.01)
  *F02M 25/07* (2006.01)

(56) References Cited

U.S. PATENT DOCUMENTS

| | | | |
|---|---|---|---|
| 5,142,866 A | 9/1992 | Yanagihara et al. | |
| 5,408,979 A | 4/1995 | Backlund et al. | |
| 5,893,391 A | 4/1999 | Jenski, Jr. | |
| 5,893,392 A * | 4/1999 | Spies et al. | 137/625.47 |
| 6,378,308 B1 | 4/2002 | Pflüger | |
| 6,802,184 B2 | 10/2004 | Huter et al. | |
| 6,976,505 B2 * | 12/2005 | McLane et al. | 137/625.11 |
| 6,983,596 B2 * | 1/2006 | Frankenstein et al. | 60/602 |
| 7,051,527 B2 * | 5/2006 | Schmid et al. | 60/602 |
| 7,165,403 B2 | 1/2007 | Sun et al. | |
| 7,347,048 B2 * | 3/2008 | Albat | 60/614 |
| 7,637,106 B2 * | 12/2009 | Hertweck et al. | 60/602 |
| 8,011,186 B2 * | 9/2011 | McEwan et al. | 60/612 |
| 2003/0074899 A1 | 4/2003 | Yamaguchi et al. | |
| 2003/0188535 A1 | 10/2003 | Mader et al. | |
| 2004/0040300 A1 | 3/2004 | Klingel | |
| 2004/0134193 A1 | 7/2004 | Klingel | |
| 2006/0042246 A1 | 3/2006 | Gray, Jr. et al. | |
| 2006/0042247 A1 | 3/2006 | Haugen | |
| 2006/0070381 A1 | 4/2006 | Parlow et al. | |
| 2009/0038309 A1 * | 2/2009 | Cocca et al. | 60/612 |
| 2009/0211245 A1 * | 8/2009 | Mcewan et al. | 60/602 |
| 2009/0211246 A1 * | 8/2009 | McEwan et al. | 123/562 |
| 2009/0211247 A1 * | 8/2009 | McEwan et al. | 60/602 |
| 2011/0000208 A1 * | 1/2011 | Robinson et al. | 60/602 |

FOREIGN PATENT DOCUMENTS

| | | |
|---|---|---|
| DE | 19740609 A1 | 12/1998 |
| DE | 10222919 A1 | 12/2003 |
| EP | 0864737 A1 | 9/1998 |
| EP | 0949411 A2 | 10/1999 |
| EP | 1258603 A1 | 11/2002 |
| EP | 1375868 A1 | 1/2004 |
| JP | 61200331 | 9/1986 |
| JP | 62265442 | 11/1987 |
| JP | 63009616 A | 1/1988 |
| JP | 2005315163 A | 11/2005 |
| WO | 2004042206 A1 | 5/2004 |

OTHER PUBLICATIONS

International Search Report, PCT/GB2007/002868, Nov. 23, 2007, Cummins Turbo Technologies Limited.

* cited by examiner

MULTI-STAGE TURBOCHARGER SYSTEM

CROSS REFERENCE TO RELATED APPLICATIONS

The present application is a continuation of U.S. patent application Ser. No. 12/322,342 filed on Jan. 29, 2009, which is a continuation of PCT/GB2007/002872 filed on Jul. 27, 2007, which claims priority to United Kingdom Patent Application No. GB0615143.5, filed Jul. 29, 2006, each of which is incorporated herein by reference.

The present invention relates to a multi-stage turbocharger system. Particularly, but not exclusively, the present invention relates to a two stage turbocharger system.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; an annular inlet passageway defined between facing radial walls arranged around the turbine chamber; an inlet arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Another known approach to improving turbocharging efficiency for an engine with a wide speed/load range is to provide a sequential two stage turbocharging system, comprising one relatively small high pressure turbocharger and another relatively large low pressure turbocharger. The turbochargers are arranged in series so that exhaust from the engine flows first through the smaller turbine of the high pressure turbocharger and then through the larger turbine of the low pressure turbocharger. A valve controlled bypass passage is provided for allowing exhaust gas to bypass the high pressure turbine at high engine speeds and/or loads. Similarly, the compressors of the two turbochargers are also arranged in series, with air flowing first through the relatively large compressor of the low pressure turbocharger and then through the relatively small compressor of the high pressure turbocharger. Again, a valve controlled bypass is provided to allow the inlet air to bypass the compressor of the high pressure turbocharger at high engine speeds and/or loads.

It is an object of embodiments of the present invention to provide an alternative or improved multi-stage turbocharger system.

According to the present invention there is provided a turbocharger system comprising a first relatively small turbocharger; a second relatively large turbocharger; the first turbocharger comprising a first exhaust turbine situated in a first exhaust passage; the second turbocharger including a second exhaust turbine situated in said first exhaust passage downstream of said first turbine; an exhaust bypass flow passage communicating with the first exhaust flow passage upstream and downstream of the first turbine; and a rotary valve located at a junction of the bypass flow passage and the first exhaust gas flow passage, the rotary valve comprising a valve rotor which is rotatable about a valve axis to selectively permit or block flow to the second turbine inlet from the first exhaust gas passage and/or bypass gas passage.

In preferred embodiments the valve rotor rotates within a valve chamber which has a first port communicating with the first exhaust gas passage, a second port communicating with the bypass exhaust gas passage, and a third port communicating with the second turbine.

The valve rotor may be rotatable about said axis into a position in which each of the three ports is at least substantially unobstructed. This allows exhaust gas flow to bypass the first turbine. The valve rotor may be rotatable about said axis into one of a plurality of positions in which the first port and third port are unobstructed and the second port is at least a partially obstructed to modulate the amount of bypass flow.

The valve rotor may be rotatable into a position in which the second port is fully obstructed. This may direct all exhaust gas flow through the first turbine.

The valve rotor may be rotatable about said axis into a position in which the second port is at least substantially obstructed and either the third port or the first port is at least partially obstructed. In this position, and with fuel supplied to the engine, the exhaust gas temperature can be raised. The valve rotor may be rotatable about said axis into one of a plurality of positions in which the second port is at least partially obstructed and either the third port or the first port is at least partially obstructed to modulate the exhaust heating effect.

In preferred embodiments, the exhaust heating is achieved by partially obstructing the third port rather than the first port. The first port may be unobstructed. The second port may be fully obstructed.

The valve rotor may be rotatable into a position in which the first port is at least substantially obstructed and either the third port or the second port is at least partially obstructed. Thus may provide engine braking. The valve rotor may be rotatable about said axis into one of a plurality of positions in which the first port is at least substantially obstructed and either the third port or the second port is at least partially obstructed to modulate the braking effect. The first port may be fully obstructed. Preferably the second port is unobstructed and the third port is at least partially obstructed.

The junction may be downstream or upstream of said first turbine.

In some embodiments the junction is downstream of the first turbine, the first port is an inlet port communicating with the first turbine, the second port is an inlet port communicating with the bypass exhaust gas passage, and the third port is an outlet port communicating with the second turbine.

In some embodiments the junction is upstream of the first turbine, the first port is an inlet port communicating with the first exhaust gas passage, the second port is an outlet port communicating with the bypass exhaust gas passage, and the third port is an outlet port communicating with the second turbine via the first turbine. In such embodiments the valve rotor may be rotatable into at least one position in which the second port is at least substantially obstructed and the first port is at least partially obstructed. This will provide exhaust heating in an engine fired mode. Preferably the second port is fully obstructed and the third port is unobstructed. The valve rotor may be rotatable into at least one position in which the third port is at least substantially obstructed and the first port is at least partially obstructed. This will provide engine braking. Preferably the valve rotor is rotatable into a position in which the third port is fully obstructed and the second port is unobstructed.

The valve may comprise a barrel valve body rotatably housed within a valve chamber defined within a housing of either the first turbine or the second turbine, the barrel valve body being rotatable about a valve axis to selectively permit or block flow to the second turbine inlet from the first exhaust gas passage and/or bypass gas passage. The barrel valve body is a form of valve rotor of a rotary valve. In other embodiments of the invention the exhaust flow control valve may comprise a rotary valve of a type other than a valve comprising a barrel valve body rotatably housed within a valve chamber defined within a housing of either the first turbine or the second turbine.

Embodiments of the invention may comprise a pressure release valve for venting gas from either the exhaust bypass gas passage or the valve chamber upstream of the second turbine inlet. The pressure release valve may be operable to maintain pressure within the exhaust gas bypass passage and/or valve chamber within a desired range and/or below a desired maximum and/or at a desired value. The pressure release valve may be biased into a closed position and operates to open when pressure within the bypass gas flow passage or valve chamber increases above a threshold sufficient to move the valve into an open position against the biasing force.

The rotary valve may be housed within a housing which is separate to or integral with either one of the first and second turbine housings.

The first and second turbines may have a common turbine housing, the rotary valve being housed within said common turbine housing either upstream or downstream of the first turbine inlet.

The valve rotor may comprise an arcuate surface which at least partially covers the first and/or second, and/or third port when the valve rotor is in a position in which the respective port is at least partially obstructed. The arcuate surface may for instance define a sector of a cylinder.

The valve rotor may be rotatably supported at first and second ends thereof for rotation about said axis. An electric, pneumatic, hydraulic or other form of actuator may be provided for effecting rotation of the valve rotor. For instance the rotary valve or actuator may be adapted to receive control signals from a controller such as an engine control unit (ECU).

The turbocharger system may include at least one sensor from the following group, a sensor for detecting or determining the speed of rotation of the first turbine and/or the second turbine, a sensor for detecting or determining the boost pressure generated by the first and/or second turbocharger; a sensor for detecting or determining the back pressure in the exhaust gas bypass path; a sensor for detecting or determining pressure within the rotary valve chamber; a sensor for detecting or determining the rotational speed of an engine to which the turbocharger system is operably connected; and a sensor for detecting or determining load on an engine to which the turbocharger system is operably connected.

A second turbocharger exhaust bypass flow passage may be provided, communicating between the outlet of the second turbocharger and the inlet of the second turbocharger downstream of said junction, and a bypass flow control valve provided for selectively permitting exhaust gas flow to bypass said second turbine.

A turbocharged internal combustion engine including a turbocharger system according to the present invention may include an exhaust gas re-circulation system comprising a re-circulation gas flow path from an exhaust side to an air intake side of the engine, and an exhaust gas re-circulation valve provided in said path for controlling re-circulation of exhaust gas to the air intake side of the engine, wherein the rotary valve is operable to modulate back pressure in the exhaust gas flow to assist in the exhaust re-circulation.

The present invention also provides a turbocharger, comprising a turbine wheel mounted for rotation within a turbine chamber defined by a turbine housing, the housing defining a first inlet passage, a second inlet passage, and a third passage communicating with said turbine chamber, the first, second and third passages meeting at a junction, wherein a rotary valve is located at said junction, the rotary valve comprising a valve rotor which is rotatable about a valve axis to selectively permit or block exhaust gas flow to the third inlet passage from either the first inlet passage and/or second inlet passage.

The valve rotor may rotate within a valve chamber defined by the housing, the valve chamber having a first inlet port communicating with the first inlet passage, a second inlet port communicating with the second inlet passage, and an outlet port communicating with the third inlet passage.

The valve rotor may be rotatable about said axis into a position in which each of the three ports is at least substantially unobstructed. The valve rotor may be rotatable about said axis into at least one position in which the first inlet port and the outlet port are unobstructed, and the second inlet port is at either partially or fully obstructed. The valve rotor may rotatable about said axis into at least one position in which the first inlet port is unobstructed, the second inlet port is fully obstructed and the outlet port is either partially or fully obstructed. The valve rotor may rotatable into at least one position in which the second inlet port is unobstructed, the first inlet port is fully obstructed, and the outlet port is partially or fully obstructed. The valve rotor may be rotatable into a position in which the outlet port is fully obstructed.

A pressure release valve for controlling or limiting pressure within the second inlet passage and/or the valve chamber.

The first turbocharger may include a first air-compressor situated in a first air passage, and the second turbocharger may include a second air-compressor situated in said first air flow passage upstream of said first compressor. A bypass air flow passage may communicate with the first air flow passage upstream and downstream of the first air-compressor, and an air flow bypass valve may be operated to control the air flow through the first compressor and the bypass air flow passage.

The present invention also provides methods of operating the turbocharger system according to the present invention. Operating modes may include a normal fired mode for controlling the exhaust gas flow to the first and second turbines, a braking mode (non-fired mode) in which the rotary valve is operated to provide a braking back pressure in the exhaust system, and an exhaust gas heating mode (fired operating mode) in which the valve is operated to restrict exhaust gas flow to thereby heat the exhaust gas flow. In the exhaust gas heating mode, the turbocharger system may be part of a system comprising an exhaust after-treatment system.

Specific embodiments of the present invention will now be described, by way of example only, with reference to the accompanying drawings, in which.

Figure 1:
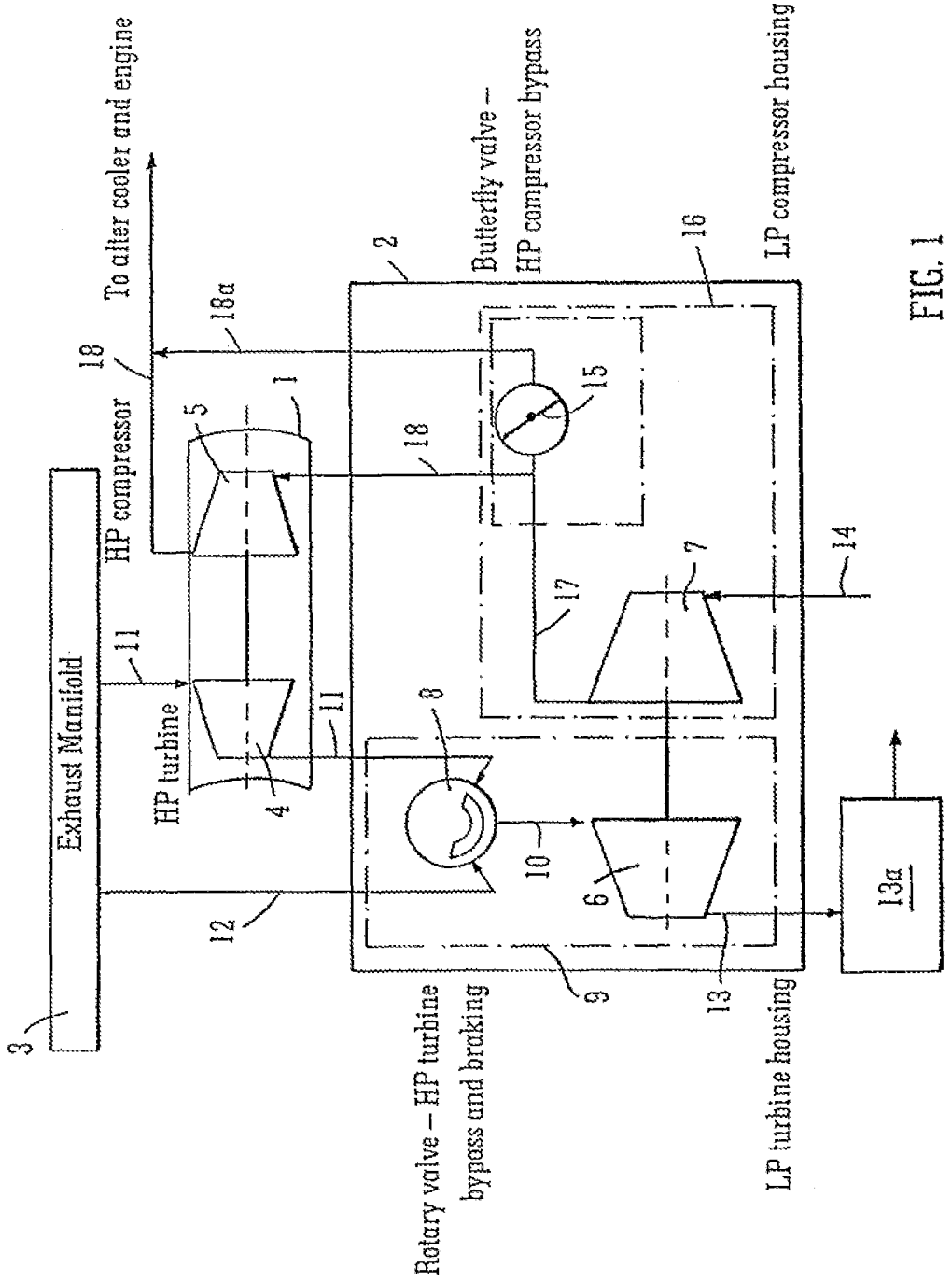
FIG. 1 is a schematic illustration of a two-stage turbocharging system according to a first embodiment of the present invention.
Figure 4A:
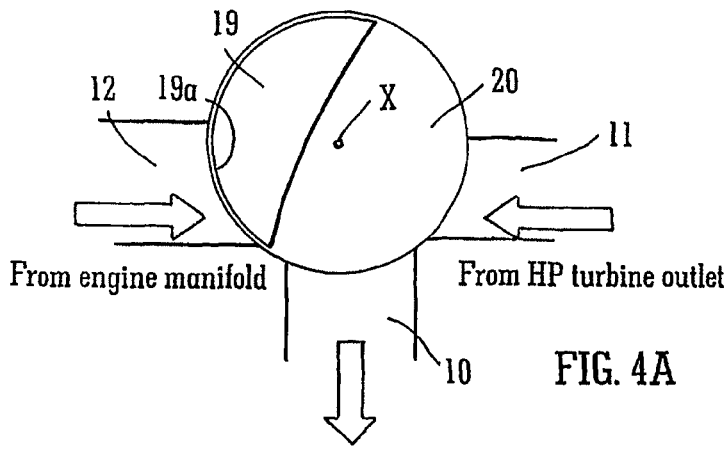
Figure 4B:
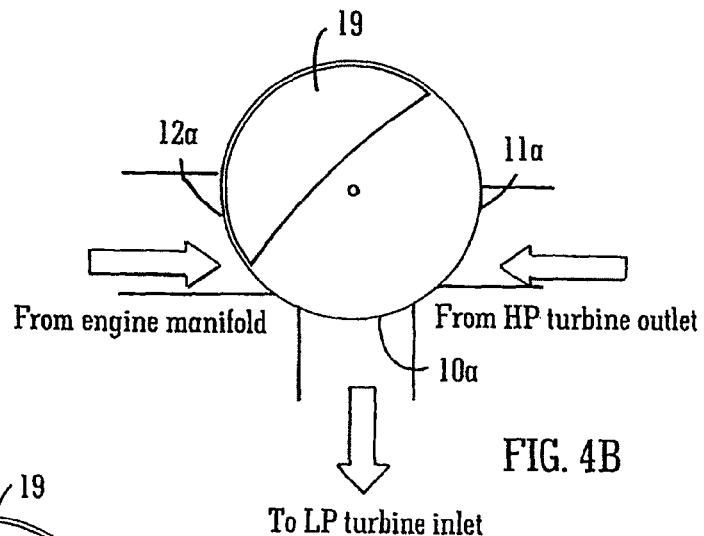
Figure 4C:
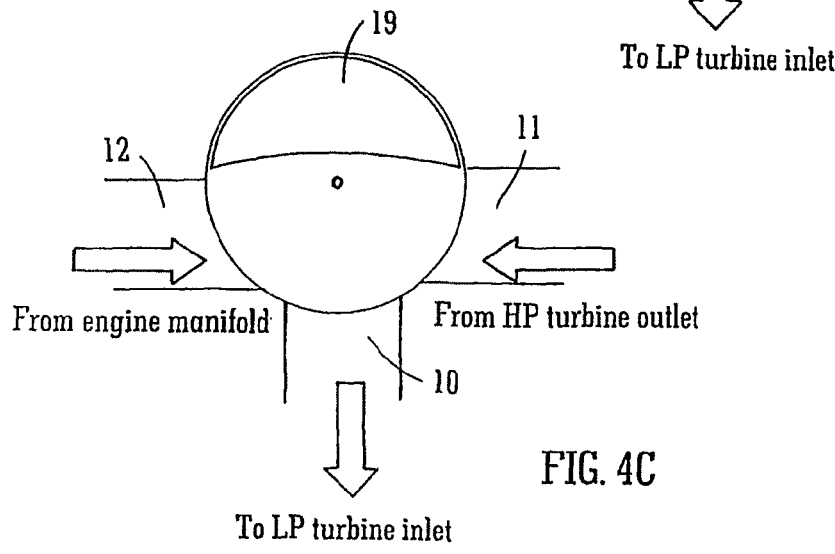
Figure 5:
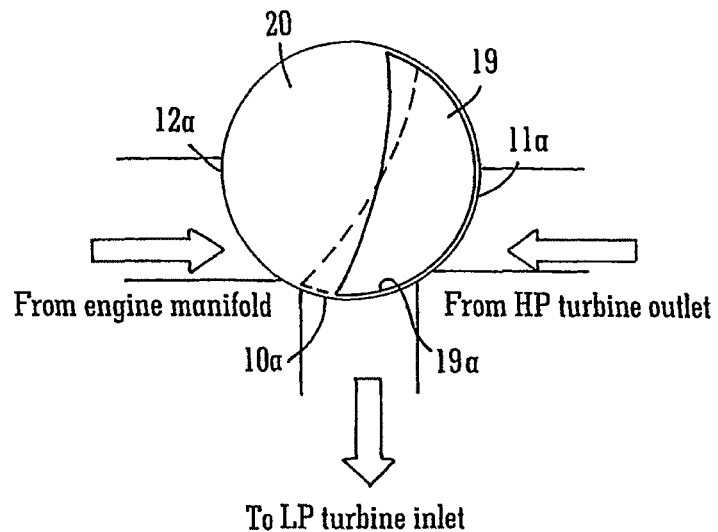
Figure 6:
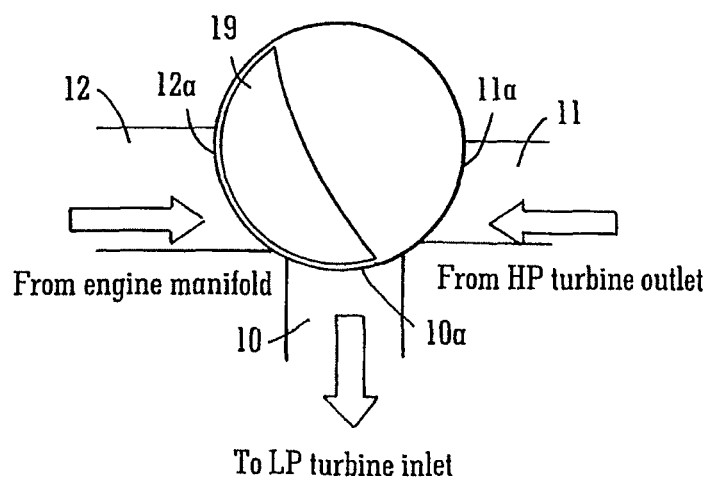
Figure 7:
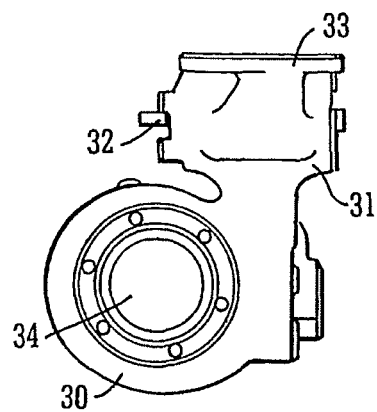
Figure 9:
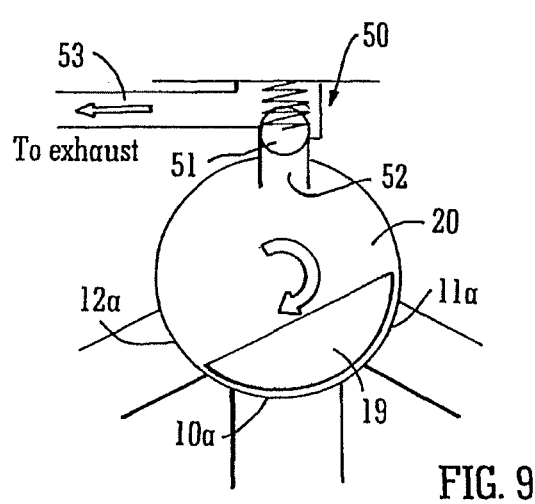
Figure 10:
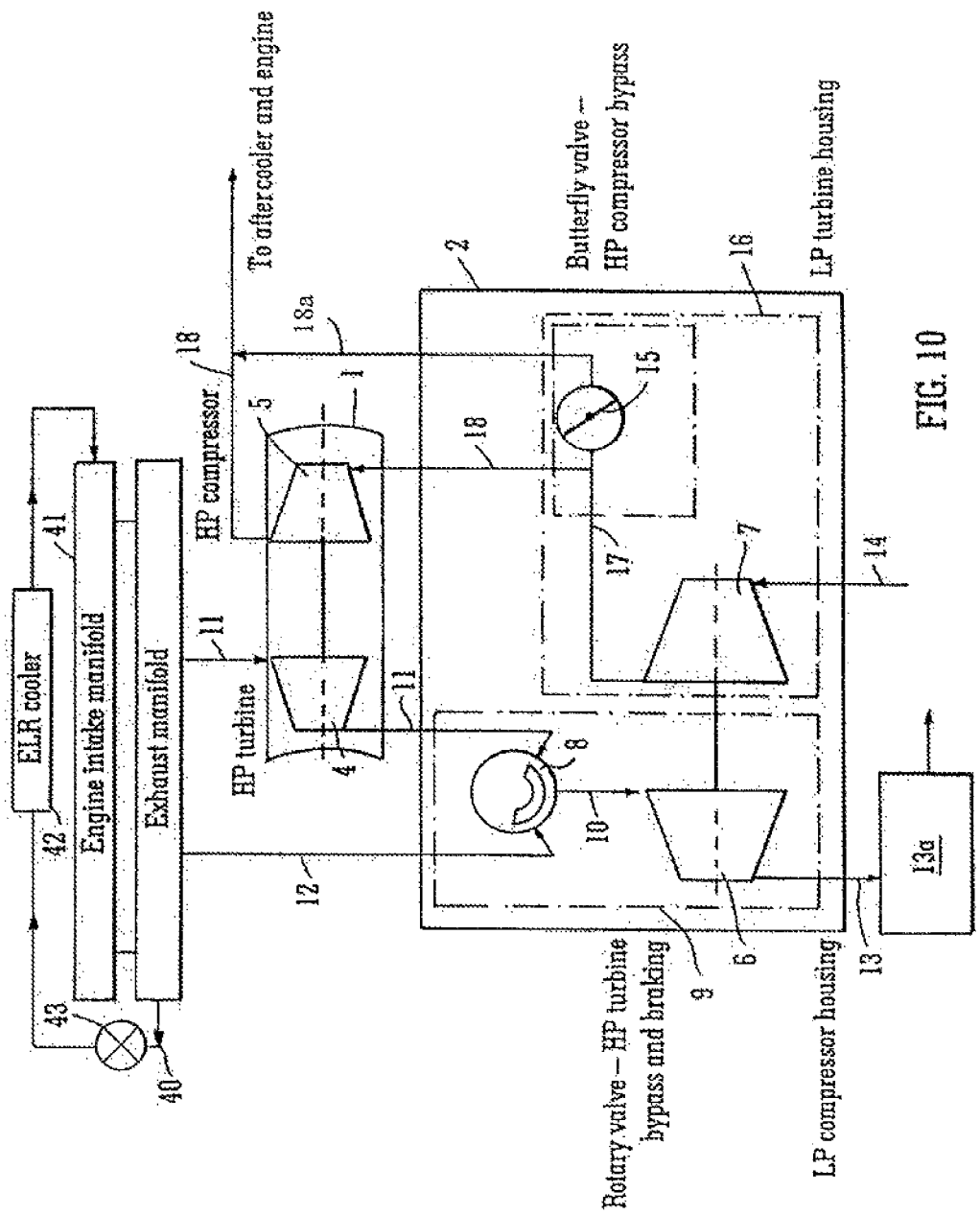
Figure 11:
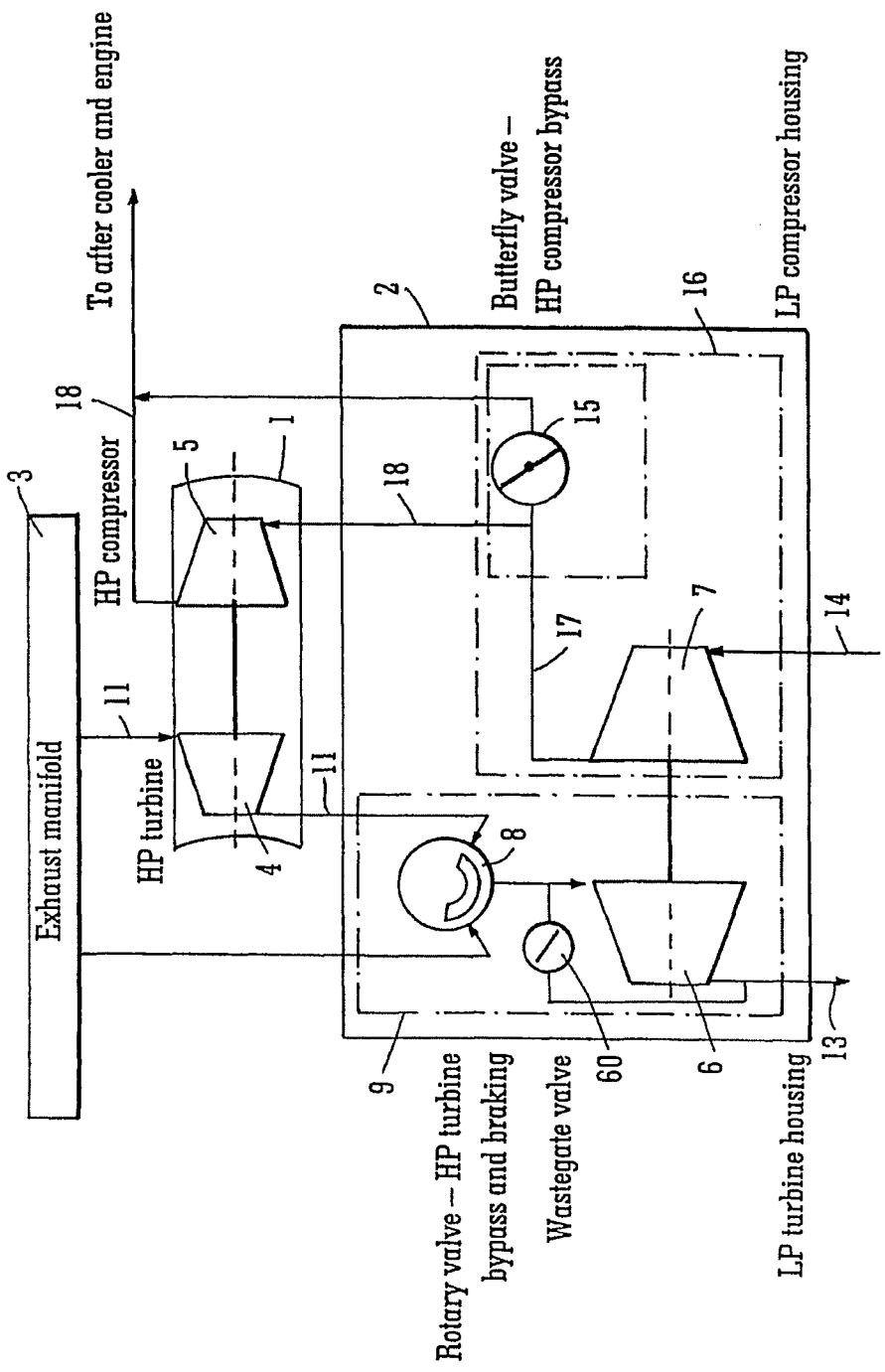
Figure 12:
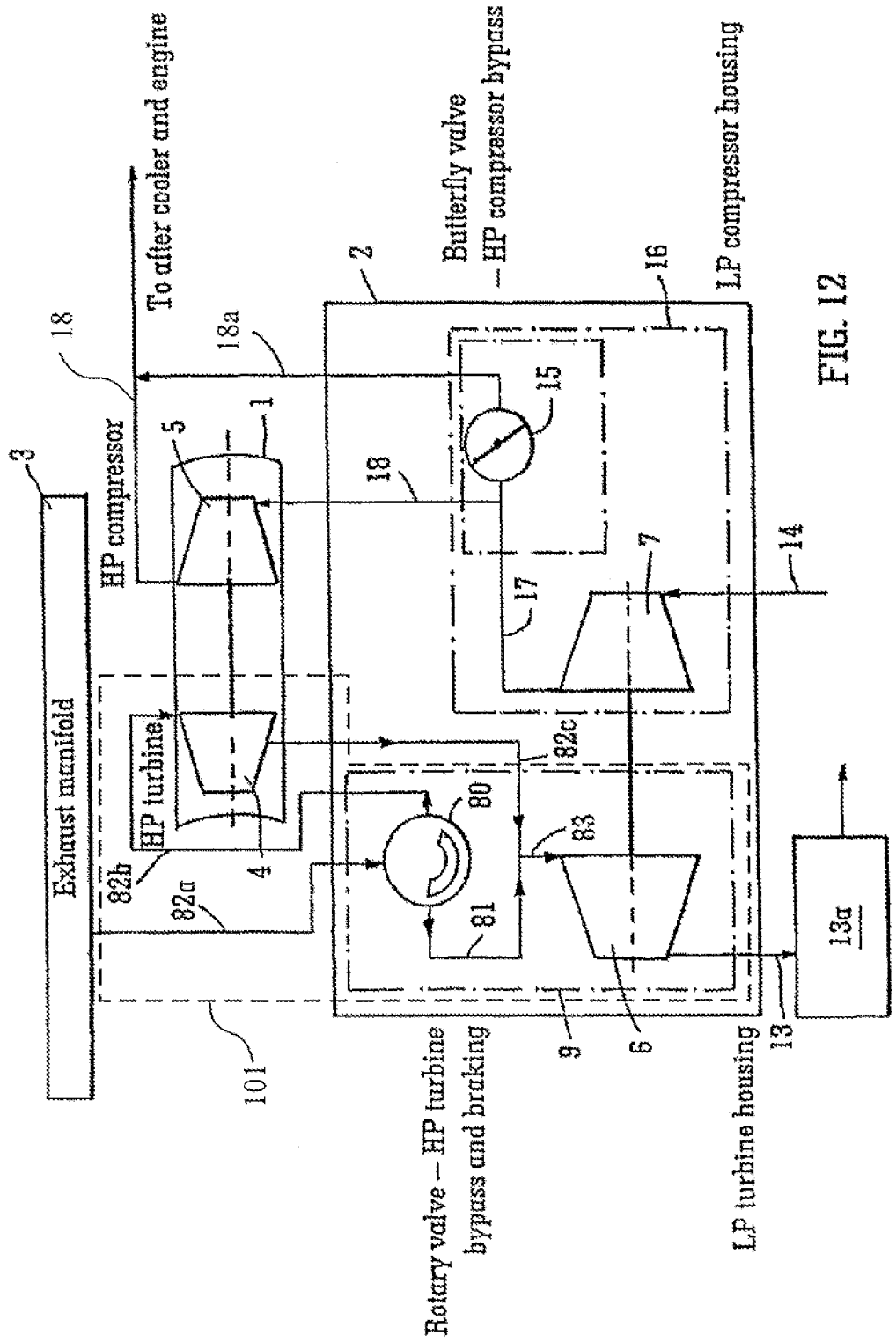
Figure 13A:
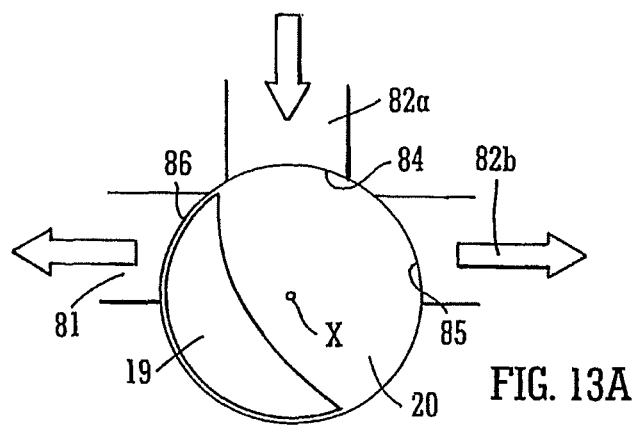
Figure 13B:
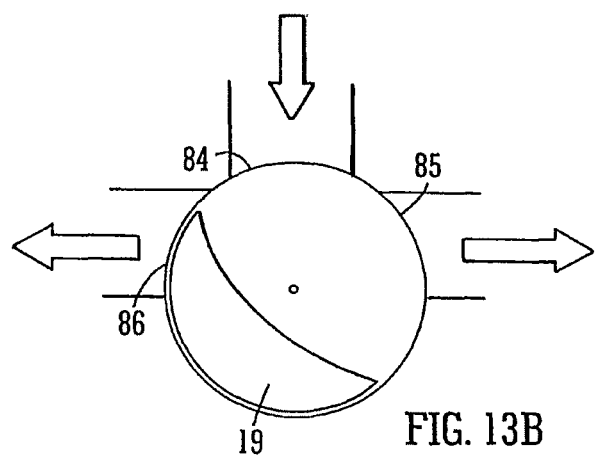
Figure 13C:
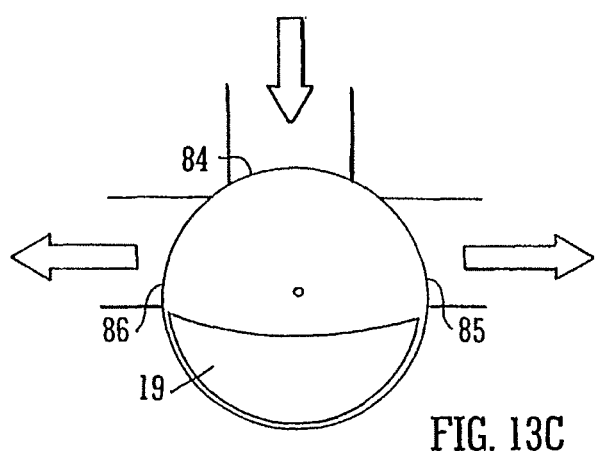
Figure 14:
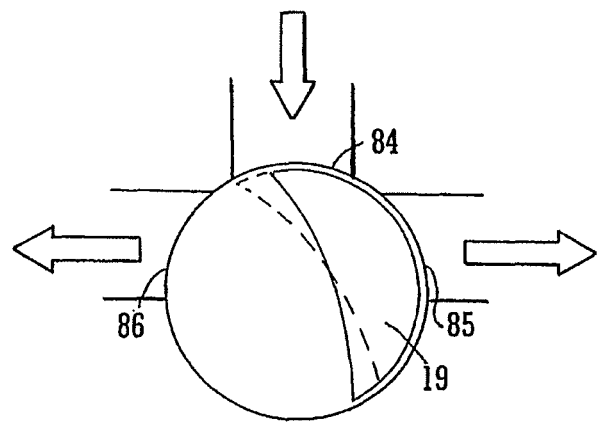
Figure 15:
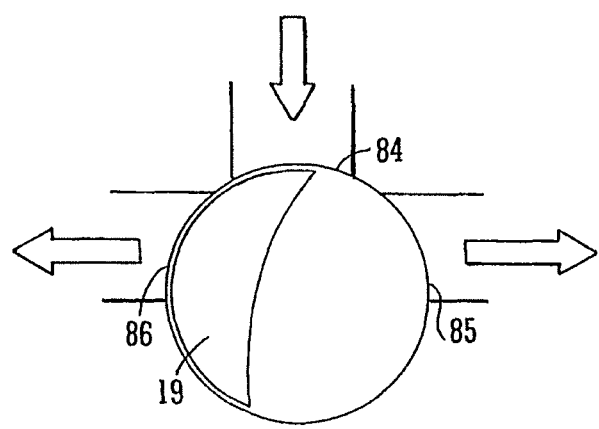

FIGS. 4a-4c schematically illustrate a fired mode of operation of the present invention;

FIG. 5 schematically illustrates a braking mode of operation of the present invention;

FIG. 6 schematically illustrates an exhaust heating mode of operation of the present invention;

FIG. 7 is an end view of a turbocharger of a turbocharging system in accordance with the present invention;

FIGS. 8a to 8e are cross-sections of the turbocharger of FIG. 7 illustrating a valve rotor position in various operating modes;

FIG. 9 schematically illustrates an alternative exhaust control valve in accordance with an embodiment of the present invention;

FIG. 10 schematically illustrates application of the turbocharging system of FIG. 1 to an engine with an EGR system;

FIG. 11 illustrates a modification of the turbocharger system of FIG. 1 in accordance with the present invention;

FIG. 12 is a schematic illustration of a two-stage turbocharging system according to a further embodiment of the present invention;

FIGS. 13a to 13c schematically illustrate a fired mode of operation of the turbocharging system of FIG. 12;

FIG. 14 schematically illustrates a braking mode of operation of the turbocharging system of FIG. 12; and FIG. 15 schematically illustrates an exhaust heating mode of operation of the turbocharging system of FIG. 12.

Referring first to FIG. 1, the schematically illustrated sequential two stage turbocharging system comprises a relatively small high pressure (HP) turbocharger 1 and a relatively large low pressure (LP) turbocharger 2 connected in series to the exhaust manifold 3 of an internal combustion engine (not shown) such as a diesel engine. The HP turbocharger 1 comprises a relatively small exhaust turbine 4 and a relatively small compressor 5. The LP turbocharger 2 comprises a relatively large exhaust turbine 6 and a relatively large compressor 7.

An exhaust gas flow control valve 8 is located within the turbine housing 9 of the low pressure turbocharger 2 to control exhaust gas flow to the LP turbine exhaust gas inlet path 10. The exhaust flow control valve 8 is operable to control flow to the LP turbine inlet path 10 via two possible exhaust gas flow paths. A first exhaust gas flow path 11 delivers exhaust gas from the exhaust manifold 3 to the LP turbine inlet path 10 via the HP turbine 4 and control valve 8. A second, bypass, flow path 12 delivers exhaust gas from the exhaust manifold 3 to the LP turbine inlet path 10 via valve 8 only, bypassing the HP turbine 4. Exhaust gas leaves the LP turbine 6 via exhaust outlet path 13 from where it may be fed to a conventional exhaust system which may include a conventional exhaust after-treatment system 13a. The after-treatment system 13a may be one of a variety of types of after-treatment system, including conventional systems generally known to one of ordinary skill in the art. Types of after-treatment systems contemplated include those designed to remove particulates, nitrogen-oxide compounds, and other regulated emissions.

As will be described in more detail below, the control valve 8 according to the present invention is operable to permit/block (and to modulate) exhaust gas flow to the LP inlet path 10 from either one or both of the two flow paths 11 and 12.

The turbocharging system delivers compressed air to the engine (including any after cooler as appropriate) via an air inlet 14 to the LP compressor 7. An air flow control valve 15 is located within the compressor housing 16 of the LP turbocharger 2 to control the flow from the LP turbine outlet path 17 to the engine (after-cooler etc). The air flow control valve 15, which may for instance be a conventional butterfly valve (or other valve type such as a rotary valve, gate valve, flap valve, poppet etc), is operable to control air flow along two possible flow paths, a first flow path 18 via the HP compressor 5, and a second, bypass, flow path 18a which allows the air flow to bypass the HP compressor 5. The air flow control valve 15 can thus be controlled (for instance by the engine management system electronic control unit-ECU) to allow air flow to bypass the HP turbocharger 1 at the same time as the exhaust gas control valve 8 is operated to allow exhaust gas flow to the LP turbocharger 2 to bypass the HP turbocharger 1. This is described in more detail below.

Figure 2:
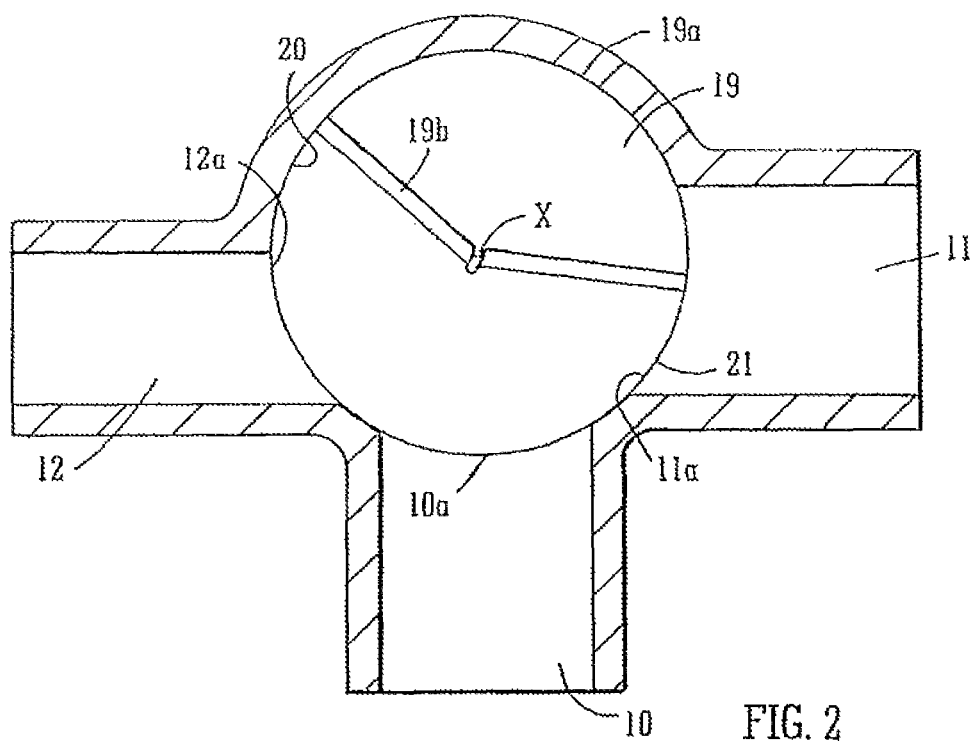
FIG. 2 is a schematic cross-section through an exhaust gas control valve of the two-stage turbocharging system of FIG. 1.

FIG. 2 is a schematic cross-section through the exhaust control valve 8 which is a rotary valve comprising a valve rotor 19, having an axis of rotation X (extending into the paper with respect to FIG. 2) within a substantially cylindrical valve chamber 20 defined within the LP turbine housing 9 at the junction of the LP turbine inlet passage 10, the exhaust gas flow path 11 from the HP turbine 4, and the bypass flow path 12 from the exhaust manifold 3. The axis extends generally transverse to the flow paths 10, 11 and 12. The valve rotor 19 is formed as a sector of a cylinder of substantially constant cross-section along its length defining a valve passage 21 through the valve chamber 20. The radially outer surface 19a of the rotor forms an arc of a cylinder so as to rotate freely within the cylindrical valve chamber 20. This general form of valve is sometimes referred to as a rotary plug valve.

Rotation of the valve rotor 19 about the axis X rotates the valve passage 21 and brings the rotor surface 19a into alignment with valve ports 10a, 11a and 12a of the paths 10, 11 and 12 respectively to partially or completely block the flow through the respective port/path. In other words, rotation of the valve rotor 19 effectively rotates the valve passage 21 to permit exhaust gas flow to the LP turbine inlet path 10 through the valve chamber 20 from either one, or both, of the exhaust flow paths 11 and 12, or to completely block the flow through the valve chamber 20.

Figure 3:
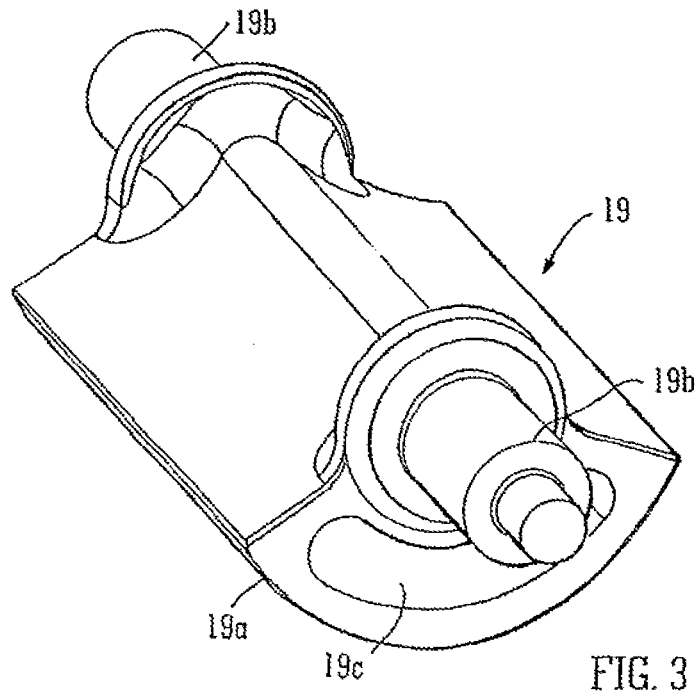
FIG. 3 is a perspective illustration of a valve rotor according to an embodiment of the present invention.

A perspective view of a one embodiment of a valve rotor 19 is shown in FIG. 3. At either axial end of the rotor 19 is a stub shaft 19b defining the axis X and permitting the valve rotor to be rotatably mounted within a valve body defining the valve chamber 20 (the valve body is not shown in FIG. 3). The particular rotor illustrated has an internal bore 19c to reduce the weight of the rotor. Appropriate bearing arrangements (not shown) for mounting of the rotor within the valve body, and appropriate valve actuating mechanisms (not shown), will be known to the skilled person. For instance the actuator may be an electric actuator, such as for example a stepper motor or other rotary electric actuator, or may comprise a pneumatic or hydraulic actuator or any other form of actuator. An actuator may be directly connected to one of the valve rotor shafts 19b, or to a valve rotor spindle (not shown) which may extend from one of the axles. The actuator may be directly connected to the rotor or connected to the rotor via a gear box or the like. Various possible coupling arrangements will be apparent to the appropriately skilled person.

The movement and positioning of the valve rotor will typically be controlled by the ECU, according to one or more control regimes. For instance, the position of the valve may be controlled in response to engine speed and/or load, the speed of the HP and/or LP turbines, or the boost pressure produced at the engine inlet manifold by the turbocharger system.

Exemplary modes of operation of the turbocharging system including the exhaust gas control valve 8 are described below with reference to FIGS. 4a to 4c, 5 and 6. In these figures valve rotor 19 is shown schematically with a slightly different cross-sectional profile, which defines a different valve passage configuration, to that illustrated in either FIG. 2 or FIG. 3, but the principal of construction and operation is the same.

Referring first to FIG. 4a this illustrates a position of the valve rotor 19 and valve passage 21 appropriate for exhaust flow control at low engine speeds and/or loads when there is low exhaust mass flow. The bypass exhaust gas flow path port 12a is closed by the surface 19a of the valve rotor 19 so that all of the exhaust gas flow from the engine manifold 3 to the LP turbine inlet path 10 flows along the flow path 11 through the HP turbine 4. The air flow bypass valve 15 will also be closed, or substantially closed, to force air flow through the HP compressor 5 (in practice it is beneficial to close the compressor bypass valve 15 before the turbine bypass is closed to provide load on the HP compressor which will prevent HP turbocharger overspeed as the turbine bypass is closed). Due to the relatively small size of the HP turbine 4 the gas flowing through it reaches a relatively high speed and thus rotates the turbine 4 (and consequentially HP compressor 5) at a relatively high speed, thereby producing substantial boost pressure despite a relatively low exhaust mass flow rate. Because of its relatively large size the LP turbine 6 rotates very little so that the LP compressor 7 produces only marginal boost.

With the valve rotor 19 in the position shown in FIG. 4a, the division of work between the HP and the LP turbines is a function of the relative flow areas of each turbine. The HP turbine is providing the majority of the work and operating at a much higher expansion ratio than the larger LP turbine. If engine speed and/or load increases with the valve rotor in the portion shown in FIG. 3a, the expansion ratio of both turbines will increase, but the HP turbocharger will continue to provide most of the boost pressure (provided its effective expansion ratio limit is not exceeded).

As the engine speed and/or load increases, the valve rotor 19 may be rotated to uncover part, or all, of the port 12a of the bypass exhaust gas path 12 to permit at least a portion of the exhaust gas flow to bypass the HP turbine. FIG. 4b illustrates the valve rotor rotated to a position in which the port 12a of the exhaust bypass gas path 12 is partially uncovered, and FIG. 4c shows the valve rotor 19 rotated to a position in which the port 12a of the bypass exhaust gas path 12 is completely uncovered. By controlling the position of the valve rotor 19 between the two extremes shown in FIGS. 4a and 4c, it is possible in accordance with the present invention to modulate the bypass gasflow through the bypass gas path 12. For instance, as the engine speed begins to rise from a low speed and/or load condition, the valve rotor 19 may be rotated to begin to open the bypass exhaust gas port 12a to permit some exhaust gas flow to bypass the HP turbine so that an increasing amount of work is done by the LP turbocharger as the engine speed and/or load rises.

The precise position of the valve rotor 19 may be controlled in accordance with a variety of different operating control strategies. For example, the valve 8 may be operated to maintain a particular expansion ratio across the HP turbine, either to maintain the HP turbine at a constant expansion ratio or at an expansion ratio within an acceptable range for particular operating conditions of the engine. The valve 8 could alternatively or additionally be operated in order to maintain the HP turbine speed within a certain range, or below a certain maximum to prevent over-speed. According to another possible control strategy, the valve 8 could be operated to generate a desired boost pressure at the engine intake manifold or to maintain the boost pressure within a desired range (e.g. above a minimum and/or below a maximum). The provision of appropriate sensors, such as turbocharger speed or boost pressure sensors, to provide appropriate control signals to the ECU will be straightforward as will be appreciated by the appropriately skilled person. The sensors might typically include sensors for monitoring engine speed and/or load, turbocharger speed, boost pressure produced by each turbocharger, boost pressure generated at the engine intake and back pressure generated within the exhaust flow path upstream of the control valve 8.

As the engine speed and/or load rises and the valve rotor 19 is rotated further towards the position shown in FIG. 4c in which the bypass gas passage is fully open; work done by the LP turbocharger relative to the HP turbocharger increases. Depending upon the particular control strategy for the bypass exhaust gas flow modulation, the overall pressure ratio of the turbocharger system may for instance rise or remain constant as the expansion ratio across the larger LP turbine increases.

It will be appreciated that as the bypass exhaust gas path port 12a is opened by rotation of the valve rotor 19, the HP compressor bypass valve 15 may also be opened as an increasing amount of boost is provided by the LP compressor. The overall boost pressure produced by the turbocharging system may rise, or may remain constant, as the bypass exhaust gas path 12 is opened depending upon the particular control regime for the control valve 8 and bypass valve 15.

At high engine load and/or speed, the valve rotor 19 is moved to the position shown in FIG. 4c in which the bypass exhaust gas path 12 is fully open, the turbocharging system again functions effectively as a single turbocharger system, with virtually all of the work now being done by the larger LP turbocharger. At this point the HP compressor bypass valve 15 will typically be fully open to bypass the HP compressor 5. There will, however, still be some exhaust gas flow through the HP turbine as there will be a pressure difference across it determined by the relative sizes of the flow passages 11 and 12. Although this would produce negligible work, it will nevertheless ensure that the HP turbine continues to rotate to help provide a smooth transfer of work with little turbo-lag in the HP turbocharger as engine conditions change and the valve 8 is operated to reduce the bypass flow, transferring compression work to the HP turbocharger.

The present invention thus provides a turbocharger system including an exhaust gas flow control valve which can be operated precisely to modulate the exhaust gas flow to the HP and LP turbochargers in varied operating conditions, and in accordance with various possible control regimes. This may be regarded as a normal fired mode operation of the turbocharging system according to the present invention. In accordance with the present invention the turbocharging system may in some embodiments be operated in one or both of two further modes, namely an engine braking mode and an exhaust gas heating mode.

Engine brake systems of various forms are widely fitted to vehicle engine systems, in particular to compression ignition engines (diesel engines) used to power large vehicles such as trucks. The engine brake systems may be employed to enhance the effect of the conventional friction brakes acting on the vehicle wheels or, in some circumstances, may be used independently of the normal wheel braking system, for instance to control down hill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

In one form of conventional engine brake system an exhaust valve in the exhaust line is controlled to substantially block the engine exhaust flow when braking is required. This produces an engine braking torque by generating a high back-pressure that increases the work done on the engine piston during the exhaust stroke.

In accordance with an embodiment of the present invention, the exhaust flow control valve 8 can be operated to provide exhaust braking, obviating the need to provide a dedicated exhaust brake valve. When operating the exhaust gas control valve 8 in an engine braking mode in accordance with the present invention, the valve rotor 19 is rotated clockwise to completely block the port 11a of the gas flow path 11 from the HP turbine 5, and to at least partially block the LP turbine inlet port 10a as shown in FIG. 5. Blocking the inlet 10 to the LP turbine obstructs exhaust gas flow through the turbocharger system thereby generating back pressure for engine braking.

The amount of back pressure generated can be modulated by appropriate control of the position of the valve rotor 19 to vary the degree to which the LP turbine inlet valve port 10a is obstructed. For instance, the dotted lines in FIG. 5 show the rotor position 19 to completely close the LP turbine inlet port 10a. At least some leakage flow through the turbocharger system is however desirable even at maximum braking to prevent excessive back pressure in the engine. This could be provided by provision of an alternative leakage flow path (such as a blow-off valve in the gas flow path 12 upstream of the exhaust control valve 8 or combined with the valve 8 itself. Alternatively a maximum gas flow may be provided by allowing at least some gas flow through the valve chamber 20 to the LP turbine inlet 10. It may be beneficial to provide for modulation of the leakage flow (for instance by varying the area of the leakage flow path through the valve chamber 20, or the leakage flow through a pressure relief valve) to for instance maintain a constant or other desired pressure characteristic over the engine speed range under braking. This may for instance be controlled by the ECU. Other characteristics such as turbocharger speed of either the HP or the LP turbocharger could be maintained at a safe level by such modulation. For instance, if the leakage flow path is a path past the valve rotor, the modulation may be achieved by adjusting the position of the valve rotor. In other embodiments, leakage flow may be provide by providing a "hard stop" preventing the valve rotor 19 from completely closing the LP turbine inlet port 10a.

Since in braking mode as illustrated in FIG. 5 the valve rotor 19 completely blocks the outlet from the HP turbine, any gas flow through the turbocharger system in the engine braking mode will flow only through the LP turbine. This ensures that there will be reduced boost pressure generated during exhaust braking, and will also ensure that the HP turbocharger cannot over-speed, bearing in mind that an exhaust brake is often applied when a vehicle is travelling long distances down hill during which there is only light load on the engine but very high engine speeds can be reached. It would also be possible to operate the control valve 8 in an engine braking mode by rotating the rotor 19 in the opposite direction so as to completely block the bypass gas flow port 12a and at least partially block the LP inlet port 10a (a position as shown for instance in FIG. 6). However, this is less desirable for braking because of unwanted boost pressure that might be generated by the HP turbine and the potential risk of the HP turbine over speeding.

Whereas the exhaust braking mode is typically a non-fired operating mode (no fuel is supplied to the engine during exhaust braking), the control valve 8 may also be operated to restrict exhaust gas flow in a fired mode (in which fuel is supplied to the engine for combination) to raise exhaust gas temperature in order to regenerate a catalytic exhaust after-treatment.

Catalytic exhaust after-treatment system performance is directly related to the temperature of the exhaust gas that passes through it. For desired performance the exhaust gas temperature must be above a threshold temperature (typically lying in a range of about 250° C. to 370° C.) under all engine operating conditions and ambient conditions. Operation of the after-treatment system below the threshold temperature range will cause the after-treatment system to build up undesirable accumulations which must be burnt off in a regeneration cycle to allow the after-treatment system to return to designed performance levels. In addition, prolonged operation of the after-treatment system below the threshold temperature without regeneration will disable the after-treatment system and cause the engine to become non-compliant with government exhaust emission regulations.

For the majority of the operation range of a diesel engine for instance, the exhaust gas temperature will generally be above the required threshold temperature. However, in some conditions, such as light load conditions and/or cold ambient temperature conditions, the exhaust gas temperature can often fall below the threshold temperature.

In engine operating conditions, such as light load conditions, in which exhaust temperature might otherwise drop below the required threshold temperature the exhaust control valve can be operated in an exhaust gas heating mode to restrict exhaust gas flow thereby reducing the airflow cooling effect and increasing exhaust gas temperature.

A position of the valve rotor 19 and valve passage 21 appropriate to an exhaust gas heating mode is illustrated in FIG. 6. The valve rotor 19 blocks flow through the bypass exhaust gas port 12a but leaves the gas flow path through the HP turbine unobstructed. However, the LP turbine inlet gas port 10a is partially obstructed to restrict flow to the LP turbine 6 (at the same time the compressor bypass valve 15 may be closed so that the incoming air flows through the HP compressor 5).

The effect of operating the valve in this way is to reduce the gas flow through the engine for any given fuel supply level (whilst maintaining sufficient air flow for combustion) in order to increase the exhaust gas temperature for instance to a level required for efficient operation and regeneration of a catalytic exhaust after-treatment system. As mentioned above, this may for example be appropriate in such conditions as light load conditions and/or cold ambient temperature conditions. The heating effect can be modulated by precise control of the valve body 19 to vary the degree of obstruction of the LP inlet path port 10a.

As with other modes of operation of the exhaust control valve 8, the exhaust gas heating mode of operation of the valve 8 will typically be controlled by the ECU. For instance, the after-treatment system may include a temperature detector for determining the temperature within the system. The temperature detector may directly determine the temperature through a sensor, or may determine the temperature through calculations and/or iterations in an algorithm or software routine. The temperature detector may determine the temperature within the system and provide a signal to the ECU to facilitate control of the exhaust gas control valve 8 to effect a change in the exhaust gas temperature as needed. The temperature determination could be made within the after-treatment system itself, or at other locations such as the outlet of the LP turbine.

The temperature determinations may be made at regular time intervals, for example a plurality of closely timed intervals, or could for instance be effectively continuous. The ECU may be programmed to operate the exhaust control valve 8 in an exhaust gas heating mode whenever the temperature in the exhaust system is determined to have fallen below a threshold temperature.

FIG. 7 and FIGS. 8a to 8e illustrate an LP turbocharger of a turbocharging system according to the present invention in which the exhaust control valve 8 is housed within a suitably adapted LP turbine housing 30. The inlet to the turbine housing is modified to define a control valve housing 31. A valve rotor spindle 32 extends from the housing for connection to an appropriate valve actuator (not shown). Also visible in FIG. 7 is an inlet flange 33 for connection to the outlet of an HP turbine, and the LP turbine outlet 34.

Figure 8A:
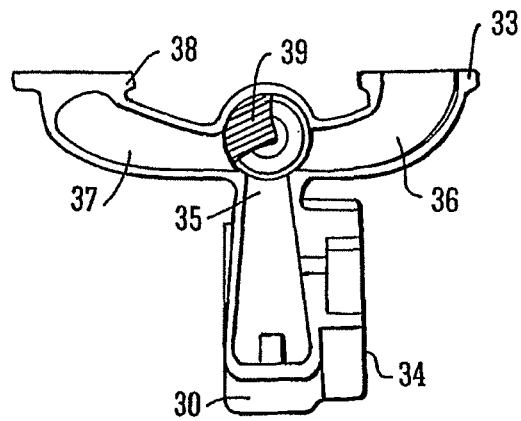
Figure 8B:
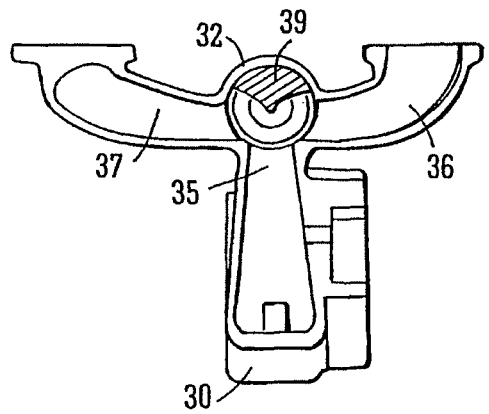
Figure 8C:
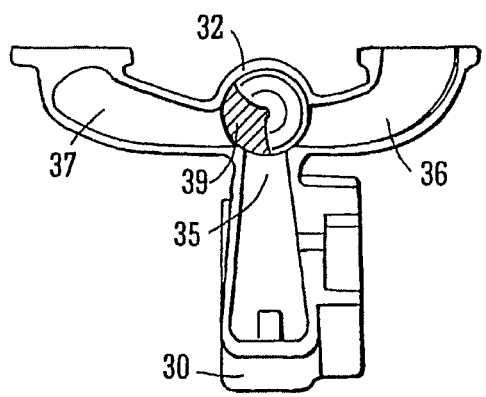
Figure 8D:
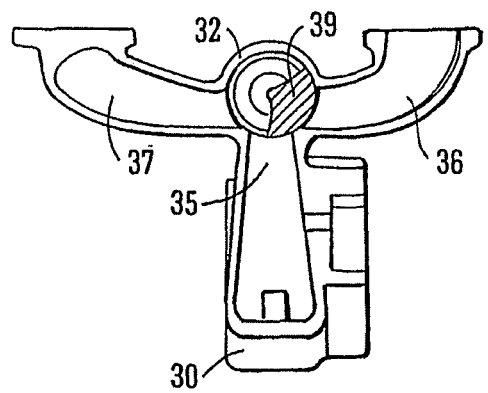
Figure 8E:
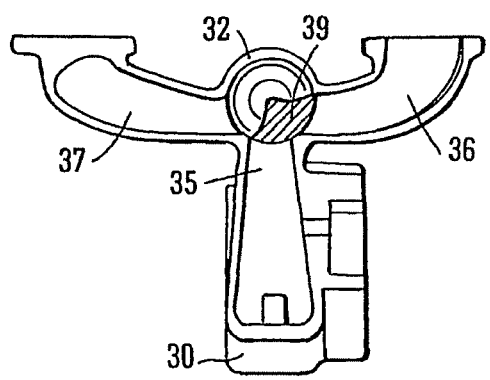

FIGS. 8a to 8e are cross-sections of the LP turbine housing of FIG. 7 taken on the line A-A of FIG. 7. These figures reveal a part of the turbine inlet path 35 as well as the HP turbine inlet path 36, exhaust bypass gas path 37 and respective inlet flanges 33 and 38. It will be appreciated that the gas flow paths 35, 36 and 37 correspond to the gas flow paths 10, 11 and 12 described above respectively. The valve rotor 39 is shown in cross-section and has a profile generally conforming to the profile of the valve rotors described above. In FIGS. 8a and 8b the valve rotor 39 is shown in a position corresponding generally to the position of the valve rotor shown in FIGS. 4a and 4c appropriate to normal fired mode operation. FIG. 8c shows the valve rotor in a position corresponding to the position shown in FIG. 6 appropriate for operation in an exhaust gas heating mode. FIGS. 8d and 8e show the valve rotor in positions corresponding generally to positions illustrated in FIG. 5 appropriate for an engine braking operating mode.

A modification of the exhaust flow control valve described above and which incorporates a pressure release valve is schematically illustrated in FIG. 9. The rotary valve is substantially the same as the rotary valves above comprising a valve rotor 19 rotatably mounted within a valve chamber 20 to selectively cover/uncover gas flow ports 10, 11a and 12a. The modification comprises the inclusion of a pressure relief valve 50 which comprises a spring biased valve member 51 which seats within a valve passage 52. As pressure within the rotary valve chamber 20 rises above a threshold pressure, the pressure relief valve member 51 is forced off its valve seat to allow exhaust gas to vent into the exhaust gas flow downstream of the LP turbine via passages 52 and 53. In an engine braking mode, as illustrated, the rotor 19 may be moved to completely block flow to the LP turbine via LP turbine inlet port 10a, the pressure relief valve 50 ensuring that the back pressure does not rise above a predetermined maximum. In a more sophisticated modification of the control valve (not illustrated) the pressure relief valve 50 could be controlled via the ECU to modulate the back pressure within the exhaust system to modulate the braking effect. This could be advantageous if it is found difficult in practice to accurately control the position of the rotary valve rotor 19 to the degree required to provide precise modulation of the braking effect. It will be appreciated that the exact form of the pressure relief valve may vary from that illustrated, and could for instance be a butterfly valve, flap valve, poppet valve or any other of a variety of suitable valves which will be readily apparent to the appropriately skilled person.

The turbocharger system of the present invention may also be operated to assist exhaust gas recirculation (EGR). In an EGR system a portion of the exhaust gas taken from the exhaust manifold is reintroduced into the inlet manifold of the engine for further combustion with a view to reducing engine emissions. Incorporation of the turbocharging system of FIG. 1 in an engine including an EGR system is schematically illustrated in FIG. 10. The illustrated EGR system includes an EGR recirculation path 40 flowing a portion of the exhaust gas to the intake manifold 41 of the engine via an EGR cooler 42. Flow through the exhaust recirculation path 40 is controlled by an EGR control valve 43. The EGR control valve 43 may be any one of a variety of conventional types commonly used in such an application, including butterfly valves, flap valves, rotary valves etc.

With modern highly efficient turbocharger systems, the boost pressure of the inlet manifold can often exceed the exhaust gas pressure at the exhaust manifold making the reintroduction of the recirculated exhaust gas to the inlet manifold problematical, for instance requiring dedicated EGR pumps etc. With the present invention, the exhaust gas control valve can be operated in such a way as to effectively reduce turbocharging efficiency below the maximum that could be achieved for any given engine operating condition in order to maintain back pressure at a level necessary to facilitate exhaust gas recirculation. In other words, the exhaust control valve 8 may be operated in such a way as to optimise engine intake and exhaust manifold conditions for exhaust gas recirculation in order to reduce emissions whilst at the same time minimising the air-fuel ratio for better fuel consumption.

A modification of the turbocharging system of FIG. 1 in which the LP turbine is provided with a wastegate valve 60 is shown in FIG. 11. The wastegate valve 60 may have any conventional form (such as for instance a poppet valve) as is well known in the art of turbocharging. The wastegate valve 60 may similarly be operated in a conventional way, for instance by a pneumatic actuator or electric actuator (not shown) to allow some of the exhaust gas flow to bypass the LP turbine as boost pressure in the LP compressor (or at the engine intake manifold) reaches a threshold value. Alternatively, or additionally, the wastegate valve 60 could for instance be operated under the control of the ECU in response to a control regime programmed into the ECU, for example to allow some exhaust gas flow to bypass the LP turbine in order to control the speed of the LP turbocharger or boost pressure produced by the LP turbine or the turbocharging system as a whole. Various methods and modes of operation of the wastegate valve 60 will be apparent to the skilled person.

In the schematic illustrations of FIGS. 1 and 4 the exhaust control valve is shown downstream of the HP turbine 5. It will be appreciated however that in other embodiments of the invention the control valve could be positioned upstream of the HP turbine 4 as schematically illustrated in FIG. 12. FIG. 12 is based on FIG. 1 and where a appropriate the same reference numerals will be used. In accordance with this embodiment of the invention, a modified exhaust flow control valve 80 is positioned upstream of the HP turbine 4 and likewise upstream of a HP bypass flow path 81. A first exhaust gas flow path 82a/82b delivers exhaust gas from the exhaust manifold 3 to the LP turbine inlet path 83. The first exhaust gas path 82a/82b has a first portion 82a communicating between the exhaust manifold 3 and the control valve 80, a second portion 82b communicating between the control valve 80 and the inlet of the HP turbine 4, and a third portion 82c communicating between the outlet of the HP turbine 4 and the LP turbine inlet path 83.

The control valve 80 may have substantially the same construction as control valve 8 described above, but in this case the three valve three valve ports comprise a single inlet port and two outlet ports. The ports are illustrated in FIGS. 13a to 13c, 14 and 15 which illustrate modes of operation of the turbocharging system of FIG. 12 which correspond to the modes of operation of the turbocharging system of FIG. 1 as illustrated in FIGS. 4a to 4c, 5 and 6 respectively.

Referring first to FIGS. 14a to 14c, the control valve 80 comprises a valve rotor 19 rotating within a valve chamber 20 to selectively open and close three valve ports, namely a valve inlet port 84 which communicates with the gas flow path 82a, a first outlet port 85 which communicates with gas flow path 82b, and a second outlet port 86 that communicates with bypass gas flow path 81. The position of the valve rotor 19 illustrated in FIG. 13a is appropriate for exhaust flow control at low engine speeds and/or loads where there is a low exhaust mass flow. The bypass exhaust gas flow path port 86 is closed by the rotor 19 so that all of the exhaust gas flow from the engine manifold 3 to the LP turbine 6 must flow along the first flow path 82a/82b comprising portions 82a and 82b, i.e. flowing through the HP turbine 4.

As the engine speed and/or load increases, the valve rotor 19 may be rotated to uncover part, or all, of the valve port 86 to permit at least a portion of the exhaust gas flow to flow along the bypass gas path 81 thereby bypassing the HP turbine 4. FIG. 13b illustrates the valve rotor 19 in a position in which the port 86 is partially uncovered, and FIG. 13c shows the valve rotor 19 in a position in which the port 86 is completely uncovered. By controlling the position of the valve rotor 19 between the two extremes shown in FIGS. 13a and 13c it is possible in accordance with the present invention to modulate the bypass gas flow through the bypass gas flow path 81.

FIGS. 14 and 15 illustrate operation of the control valve 80 in a braking mode and exhaust gas heating mode respectively. In the braking mode, the rotor 19 is rotated to block flow to the HP turbine 4 via valve port 85, and to at least partially block flow to the LP turbine 6 via the bypass gas flow path 86 by at least partially covering the valve inlet port 84. The amount of braking back pressure generated can be modulated by controlling the precise position of the valve rotor 19. For instance, the dotted lines in FIG. 15 show the rotor 19 in position to completely close the valve port 85. In this case, it may be preferable to provide a path for a leakage flow to prevent back pressure exceeding a desired limit (which could be in the same way as discussed above in relation to FIG. 5). FIG. 15 shows position of the rotor appropriate to exhaust gas heating, which is a fired operating mode of the engine. Here the rotor 19 is positioned to block exhaust gas flow to the LP turbine 6 via the valve port 86 so that all exhaust gas flows to the LP turbine 6 via the HP turbine (through port 85). However, once again the rotor 19 at least partially covers the valve inlet port 84 to restrict exhaust gas flow from the exhaust manifold 3 to thereby heat the exhaust gas in the same way as described above in relation to FIG. 6.

It will be appreciated that features and modifications that can be made to the turbocharging system of FIG. 1 may also be made to the turbocharging system of FIG. 13, such as for instance the operation of the LP and HP compressors, the inclusion of a wastegate around the LP turbine, and application of the system to an engine including the inclusion of an exhaust gas re-circulation system.

In the illustrated embodiments of the invention (in which the control valve 8 is downstream of the HP turbine) the valve is conveniently located in the housing of the LP turbine. It will be appreciated that in alternative embodiments of the invention (in which the valve is either upstream or downstream of the HP turbine) the exhaust flow control valve may be housed in a separate valve housing which is not part of either of the two turbochargers. Such an embodiment would for instance allow retrofitting of the control valve 8 to a two-stage turbocharging system. In other embodiments of the invention, particularly in embodiments in which the control valve is located upstream of the HP turbine inlet, the exhaust flow control valve could for instance be housed within the HP turbine housing. In yet other embodiments, the HP turbine and LP turbines may be combined in a common housing, the exhaust control valve being located within that common turbine housing.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suite varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

In one known type of variable geometry turbine, an axially moveable wall member, generally referred to as a "nozzle ring", defines one wall of the inlet passageway. The position of the nozzle ring relative to a facing wall of the inlet passageway is adjustable to control the axial width of the inlet passageway. Thus, for example, as gas flow through the turbine decreases, the inlet passageway width may be decreased to maintain gas velocity and optimise turbine output.

Another known type of variable geometry turbine is the "swing vane" type. This comprises a variable guide vane array with adjustable guide vanes located in the turbine inlet passageway. Each vane is pivotable about a respective pivot axis extending across the inlet parallel to the turbine axis. A vane actuating mechanism is provided which is linked to each of the vanes and is displaceable in a manner which causes each of the vanes to move in unison, such a movement enabling the cross-sectional area of the inlet, and also the angle of approach of the gas turbine wheel; to be controlled.

Although two stage turbocharging systems comprising fixed geometry turbines may in some respects provide an alternative to the use of relatively complex and expensive variable geometry turbochargers, one (or even both) of the turbochargers of a two stage turbocharging system according to the present invention could be a variable geometry turbocharger (of any type). This may be desirable for instance to further improve control over the turbocharging system and the ability to optimise turbocharging performance across a wide range of engine conditions.

In the above described embodiments of the invention there is a single HP turbine. However, it will be appreciated that a turbocharging system according to the present invention could for instance include two parallel HP turbines. For example, each of two HP turbines could receive an exhaust gas flow from a respective bank of cylinders from a multi-cylinder engine (for instance each receiving exhaust gas from one bank of a "V" configured engine). In such embodiments, with a single exhaust flow control valve 8 located downstream of the HP turbines, the outlet from each HP turbine can be combined upstream of the exhaust flow control valve. There may be a single LP turbine located downstream of the valve, or the flow may be split between two (or more) LP turbines downstream of the valve.

In embodiments comprising more than one HP turbine, HP turbines can be linked to a common HP compressor or to separate respective HP compressors.

Alternatively, rather than providing two separate HP turbines to receive exhaust gas flow from two separate banks of engine cylinders, a single twin entry HP turbine could be included in a turbocharger system according to the present invention. Moreover, in a turbocharger system according to the present invention comprising one or more HP turbines, each of the HP turbines could be configured as a twin-entry turbine.

Similarly, it will be appreciated that a turbocharging system in accordance with the present invention could have more than one set of sequentially connected turbochargers operating in parallel. For instance, a first turbocharging system generally as described above could receive an exhaust gas flow from a first set of cylinders of a multi-cylinder combustion engine, and a second sequential turbocharging arrangement as described above could receive exhaust gas flow from a second set of cylinders of the engine (each "set" could comprise a single cylinder).

It will further be appreciated that the present invention is not limited to a two stage sequential turbocharging system, but could be embodied in a turbocharging system comprising more than two turbine stages connected in series.

Other applications and modifications of the invention as described above will be apparent to the appropriately skilled person.

The invention claimed is:

1. A turbocharger comprising:
a turbine housing;
a turbine housing inlet defined by the turbine housing;
a turbine wheel mounted for rotation within a turbine chamber defined by the turbine housing;
the turbine chamber having a turbine inlet defined by the housing;
a rotary valve comprising a valve rotor which rotates about a valve axis within a valve chamber defined by the turbine housing at a junction of the turbine housing inlet and the turbine inlet within a turbine housing which also defines a second turbine chamber;
wherein the valve chamber has at least an inlet port communicating with the turbine housing inlet, a first outlet port communicating with the turbine inlet, and a second outlet port;
wherein the valve rotor is rotatable about the valve axis to selectively permit or block exhaust gas flow through the first outlet port; and
wherein the valve rotor is rotatable about the valve axis to selectively permit or block exhaust gas flow through the second outlet port.

2. The turbocharger internal combustion engine of claim 1, wherein said turbine housing defines the exhaust gas inlet.

3. The turbocharger internal combustion engine of claim 1, wherein said turbine housing is a common turbine housing which defines the first and second turbine chambers, and the exhaust gas inlet.

4. A turbocharger system comprising:
an exhaust gas inlet;
a first turbocharger,
a second turbocharger being larger than the first turbocharger;
the first turbocharger including a first exhaust turbine comprising a first turbine wheel mounted for rotation within a first turbine chamber, the first turbine chamber having a first turbine inlet and a first turbine outlet;
the second turbocharger including a second exhaust turbine comprising a second turbine wheel mounted for rotation within a second turbine chamber, the second turbine chamber having a second turbine inlet, the first turbine outlet communicating with the second turbine inlet;
a rotary valve comprising a valve rotor which rotates about a valve axis within a valve chamber defined at a junction of the exhaust gas inlet and the first turbine inlet within a turbine housing which also defines the second turbine chamber;
wherein the valve chamber has at least an inlet port communicating with the exhaust gas inlet, a first outlet port communicating with the first turbine inlet, and a second outlet port communicating with the second turbine inlet; and
wherein the valve rotor is rotatable about the valve axis to selectively permit or block exhaust gas flow through the first outlet port; and
wherein the valve rotor is rotatable about the valve axis to selectively permit or block exhaust gas flow through the second outlet port.

5. The turbocharger system of claim 4, wherein said turbine housing defines the exhaust gas inlet.

6. The turbocharger system of claim 4, wherein said turbine housing is a common turbine housing which defines the first and second turbine chambers; and the exhaust gas inlet.

7. The turbocharger system of claim 4, wherein the valve rotor is structured to provide rotation about said axis into at least one position in which the inlet port and first outlet port are unobstructed, and the second outlet port is at least partially unobstructed.

8. The turbocharger system of claim 7, wherein the second outlet port is fully unobstructed when the valve rotor is in said at least one position.

9. The turbocharger system of claim 4, wherein the valve rotor is structured to provide rotation about said axis into a position in which the first outlet port or the second outlet port is at least substantially obstructed.

10. The turbocharger system of claim 9, wherein the inlet port is unobstructed when the valve rotor is in said position.

11. The turbocharger system of claim 4, wherein the valve rotor is structured to provide rotation about said axis into a position in which the first outlet port or the second outlet port is fully obstructed.

12. The turbocharger system of claim 11, wherein the inlet port is unobstructed when the valve rotor is in said position.

13. The turbocharger system of claim 4, wherein the valve rotor comprises an arcuate surface which at least partially covers at least one of the inlet port, the first outlet port and the second outlet port when the valve rotor is in a position in which the respective port is at least partially obstructed.

14. The turbocharger system of claim 13, wherein said arcuate surface defines a sector of a cylinder.

15. The turbocharger system of claim 4, wherein the valve is rotatably supported at first and second ends thereof for rotation about said axis.

16. A turbocharged internal combustion engine including a turbocharger system comprising:
an exhaust gas inlet communicating with an exhaust gas manifold of the engine;
a first turbocharger;
a second turbocharger being larger than the first turbocharger;
the first turbocharger including a first exhaust turbine comprising a first turbine wheel mounted for rotation within a first turbine chamber, the first turbine chamber having a first turbine inlet and a first turbine outlet;
the second turbocharger including a second exhaust turbine comprising a second turbine wheel mounted for rotation within a second turbine chamber, the second turbine chamber having a second turbine inlet, the first turbine outlet communicating with the second turbine inlet;

a rotary valve comprising a valve rotor which rotates about a valve axis within a valve chamber defined at a junction of the exhaust gas inlet and the first turbine inlet within a turbine housing which also defines the second turbine chamber, wherein the valve chamber has at least an inlet port communicating with the exhaust gas inlet, a first outlet port communicating with the first turbine inlet, and a second outlet port communicating with the second turbine inlet; and wherein the valve rotor is rotatable about the valve axis to selectively permit or block exhaust gas flow through the first outlet port; and wherein the valve rotor is rotatable about the valve axis to selectively permit or block exhaust gas flow through the second outlet port.

17. The turbocharged internal combustion engine of claim 16, wherein said turbine housing defines the exhaust gas inlet.

18. The turbocharged internal combustion engine of claim 16, wherein said turbine housing is a common turbine housing which defines the first and second turbine chambers, and the exhaust gas inlet.

19. The turbocharged internal combustion engine of claim 16, wherein the valve rotor is structured to provide rotation about said axis into at least one position in which the inlet port and first outlet port are unobstructed, and second outlet port is at least partially unobstructed to allow at least a portion of the exhaust gas flow through the second turbine inlet to bypass the first turbine.

20. The turbocharged internal combustion engine of claim 16, wherein the valve rotor is structured to provide rotation about said axis into a position in which the inlet port is obstructed to block exhaust gas flow through the turbocharger system.

* * * * *